US006381636B1

(12) United States Patent
Cromer et al.

(10) Patent No.: US 6,381,636 B1
(45) Date of Patent: Apr. 30, 2002

(54) DATA PROCESSING SYSTEM AND METHOD FOR PERMITTING A SERVER TO REMOTELY ACCESS A POWERED-OFF CLIENT COMPUTER SYSTEM'S ASSET INFORMATION

(75) Inventors: Daryl Carvis Cromer, Cary; Brandon Jon Ellison, Raleigh; Howard Locker, Cary, all of NC (US); Michael Sievert, Monte Sereno, CA (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/265,920

(22) Filed: Mar. 10, 1999

(51) Int. Cl.$^7$ ............................................. G06F 15/16
(52) U.S. Cl. ...................... 709/211; 709/208; 709/223; 709/224; 709/217; 709/218
(58) Field of Search .................... 709/223, 224, 709/225, 217, 218, 219, 208–211

(56) References Cited

U.S. PATENT DOCUMENTS 6,003,081 A * 12/1999 Cromer et al. .............. 709/224
6,189,108 B1 * 2/2001 Cromer et al. .............. 713/340
6,263,388 B1 * 7/2001 Cromer et al. .............. 710/107
6,266,696 B1 * 7/2001 Cromer et al. .............. 709/224
6,282,642 B1 * 8/2001 Cromer et al. ................ 713/2

* cited by examiner

Primary Examiner—Zarni Maung
Assistant Examiner—Nabil El-Hady
(74) Attorney, Agent, or Firm—Bracewell & Patterson, LLP

(57) ABSTRACT

A data processing system and method are described for permitting a server computer system to remotely access asset information stored within one of a plurality of client computer systems. The client computer systems are coupled to the server computer system utilizing a network. Asset information is stored in a storage device within the particular client computer system. The asset information includes information identifying a plurality of components of the client computer system. The server computer system transmits a message to the client computer system while the client computer system is powered-off. A network adapter is included within the client computer system. The network adapter accesses the storage device to obtain the asset information while the client computer system is powered-off.

17 Claims, 7 Drawing Sheets

DATA PROCESSING SYSTEM AND METHOD FOR PERMITTING A SERVER TO REMOTELY ACCESS A POWERED-OFF CLIENT COMPUTER SYSTEM'S ASSET INFORMATION

BACKGROUND OF THE INVENTION

1. Field of the Invention

The present invention relates in general to data processing systems and, in particular, to a data processing system and method including a server and client computer systems coupled together utilizing a network. Still more particularly, the present invention relates to a data processing system and method including a server and client computer systems coupled together utilizing a network for permitting the server to remotely access a client computer system's asset information when the client is powered-off.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

With personal computers being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources.

Remote management of client computer systems is becoming a part of both large and medium networks. Remote management provides tremendous cost of ownership advantages and provides better quality of service for a client. However, expanding the role of remotely managed computer systems also increases the complexity of managing the computer systems on the network.

Known systems exist for remotely collecting asset information from client computer systems. However, all current solutions require the client to be powered-on, as well as executing an operating system. The asset information collected by these systems is information about the particular client's hardware and software components. For example, serial numbers, part numbers, and/or other information that identifies a client's memory, hard drives, operating system, software, and other components may be stored within the particular client. This information is stored in storage devices which are not constantly powered, and which are inaccessible to the network when the computer system is powered-off.

An industry standard Management Information Format (MIF) file is typically utilized to store the asset information. This is an industry standard file defining locations and formats for storing asset information.

One known method utilizes a Desktop Management Interface (DMI) command to permit a server to retrieve desired asset information from a client. In this method, the server transmits a DMI request to a particular client to obtain its asset information. If the client is powered-on and properly executing an operating system, the client responds by transmitting a packet to the server including the requested asset information.

Therefore a need exists for a data processing system and method for permitting a server computer system to remotely access a client computer system's asset information when the client is powered-off.

SUMMARY OF THE INVENTION

A data processing system and method are described for permitting a server computer system to remotely access asset information stored within one of a plurality of client computer systems. The client computer systems are coupled to the server computer system utilizing a network. Asset information is stored in a storage device within the particular client computer system. The asset information includes information identifying a plurality of components of the client computer system. The server computer system transmits a message to the client computer system while the client computer system is powered-off. A network adapter is included within the client computer system. The network adapter accesses the storage device to obtain the asset information while the client computer system is powered-off.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is a method and system for permitting a server computer system to remotely access asset information stored within a client computer system coupled to the server utilizing a network. Asset information is stored within each client which includes information identifying the hardware and software components of the particular client.

The server computer system transmits a message to one or all clients on the network. The server may transmit a message addressed to one individual client, or may transmit a broadcast message which is received by all clients on the network. The message is received by the clients whether or not the clients are currently powered-on or executing an operating system.

A network adapter included within the client receiving the request, then, accesses an asset storage location including the asset information. The network adapter transmits a message back to the server including the asset information. The network adapter and asset storage are constantly powered by an auxiliary power source so that the asset information may be obtained when the client is powered-off or not executing an operating system.

Figure 1:
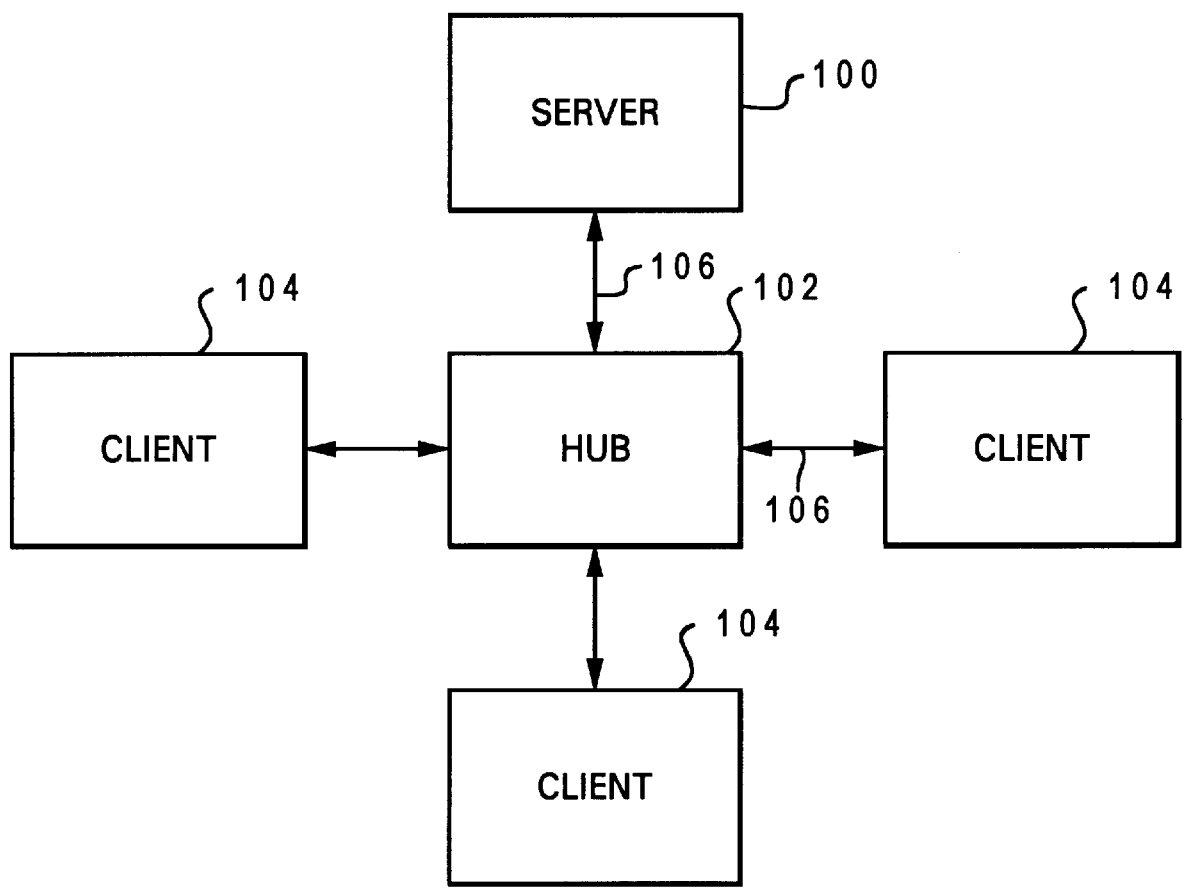
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

Figure 2:
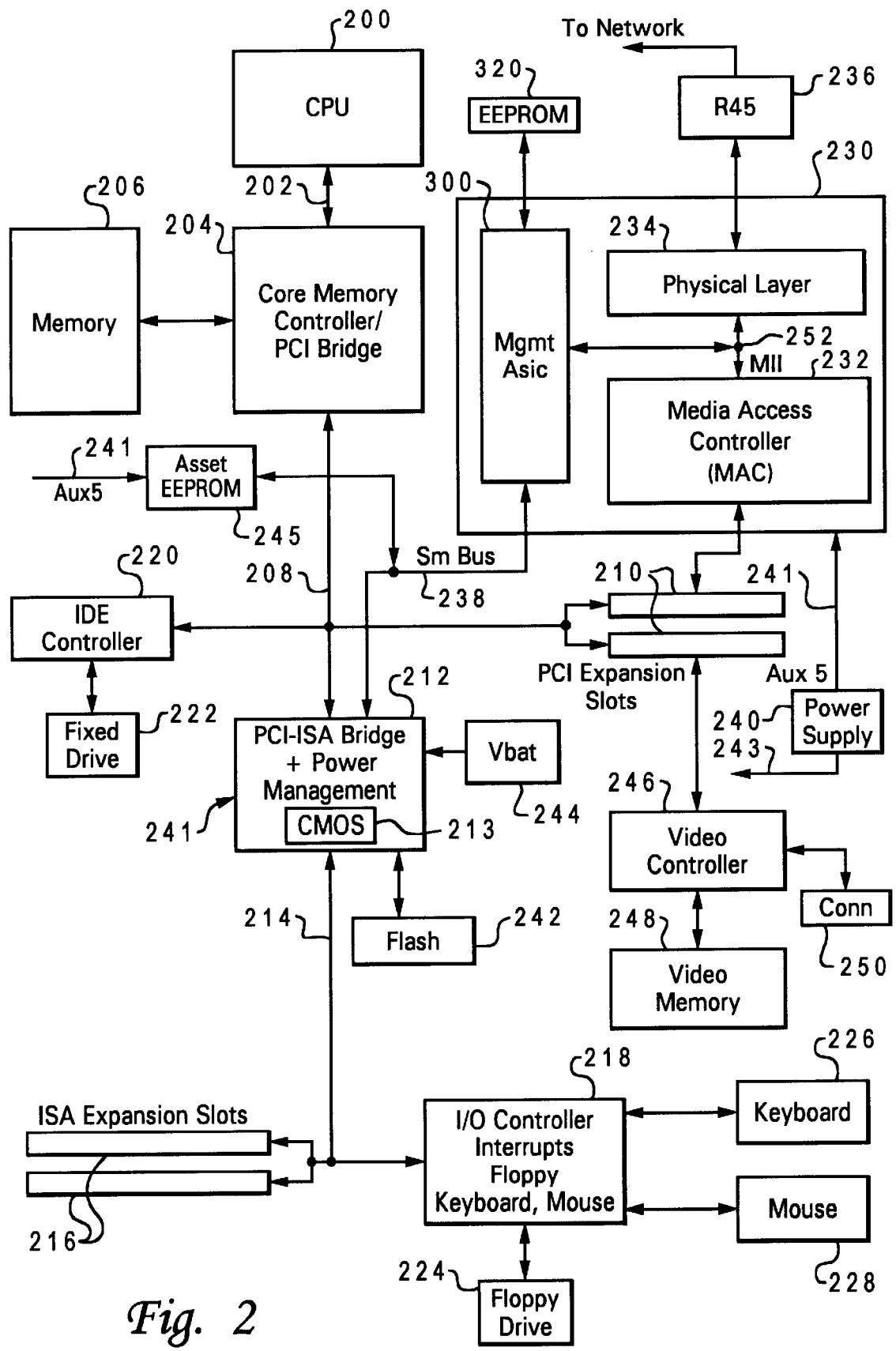
FIG. 2 depicts a pictorial representation of a processor and a network adapter included within a client computer system in accordance with the method and system of the present invention.

FIG. 2 illustrates a pictorial representation of a processor and a network adapter included within a client computer system in accordance with the method and system of the present invention. A central processing unit (CPU) 200 is connected by address, control, and data busses 202 to a memory controller and peripheral component interconnect (PCI) bus bridge 204 which is also coupled to system memory 206.

An integrated drive electronics (IDE) device controller 220 and a PCI bus to Industry Standard Architecture (ISA) bus bridge 212 are connected to PCI bus bridge 212 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

An asset EEPROM 245 is included within client 104. Asset EEPROM 245 is utilized to store a copy of all of the client's asset information. The client's asset information may be stored in another EEPROM, a flash ROM, a hard drive, or CMOS. Alternatively, the asset information may already be stored in an asset EEPROM, such as asset EEPROM 245. When the asset information is stored in an EEPROM other than asset EEPROM, a flash ROM, a hard drive, or CMOS, the asset information is copied to Asset EEPROM 245. When the asset information is stored in asset EEPROM 245, the asset information is updated to reflect any modifications made to the asset information already stored in asset EEPROM 245.

Asset EEPROM 245 is coupled to SM bus 238. Asset EEPROM 245 and network adapter 230 both receive full-time auxiliary power 241. In this manner, network adapter 230 may access EEPROM 245 while client 104 is powered-off utilizing SM bus 238.

Client computer system 104 includes a special power supply 240 which supplies full normal system power 243, and has an auxiliary power main AUX 5 241 which supplies full time auxiliary power to the power management logic 212, network adapter 230, and to asset EEPROM 245. This enables client 104 to respond to a wakeup signal from network adapter 230. In response to a receipt of the wakeup signal, normal system power 243 from power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs pre-amble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a special purpose processing unit 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire low speed serial bus used to connect system management devices. This provides a path to allow software running on client 104 to access ASIC 300. ASIC 300 utilizes SM bus 238 to access Asset EEPROM 245. With the trickle power supplied by signal AUX 5 241 from power supply 240, ASIC 300 is preferably powered full time.

Figure 3:
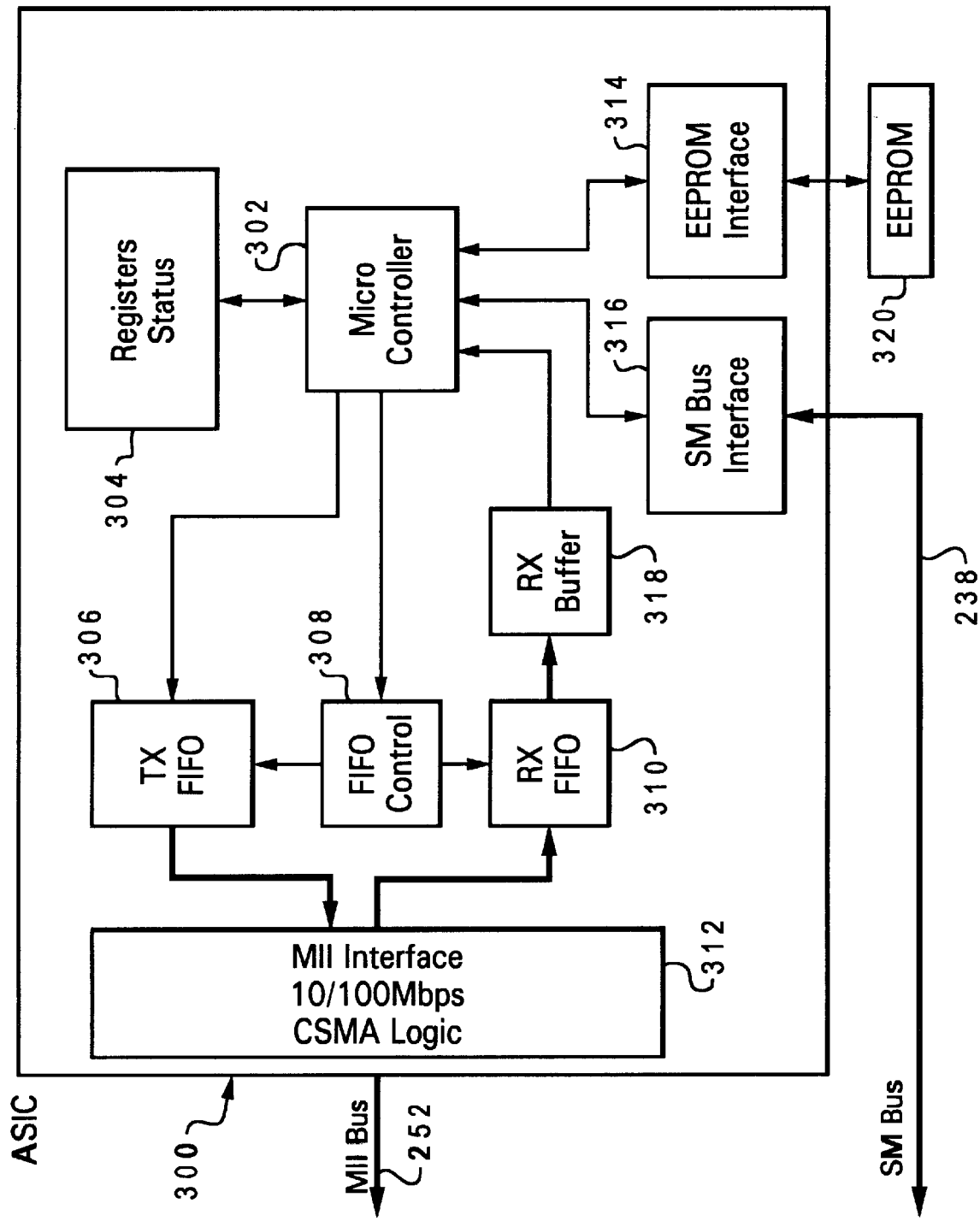
FIG. 3 illustrates a pictorial representation of a special purpose processing unit included within a network adapter in accordance with the method and system of the present invention.

FIG. 3 illustrates a pictorial representation of a special purpose processing unit included within network adapter 230 in accordance with the method and system of the present invention. Special purpose processing unit is implemented utilizing ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests through SM bus interface 316 from software running on client 104 to access register status 304. Signals are received from the MII bus 252 by interface unit 312 and passed to RX FIFO 310. ASIC includes an EEPROM interface 314 for enabling micro-controller 302 to communicate with a storage device such as EEPROM 320. Micro-controller 302 is capable of generating SM bus 238 commands to access Asset EEPROM 245 to respond to a network request for inventory.

Figure 4A:
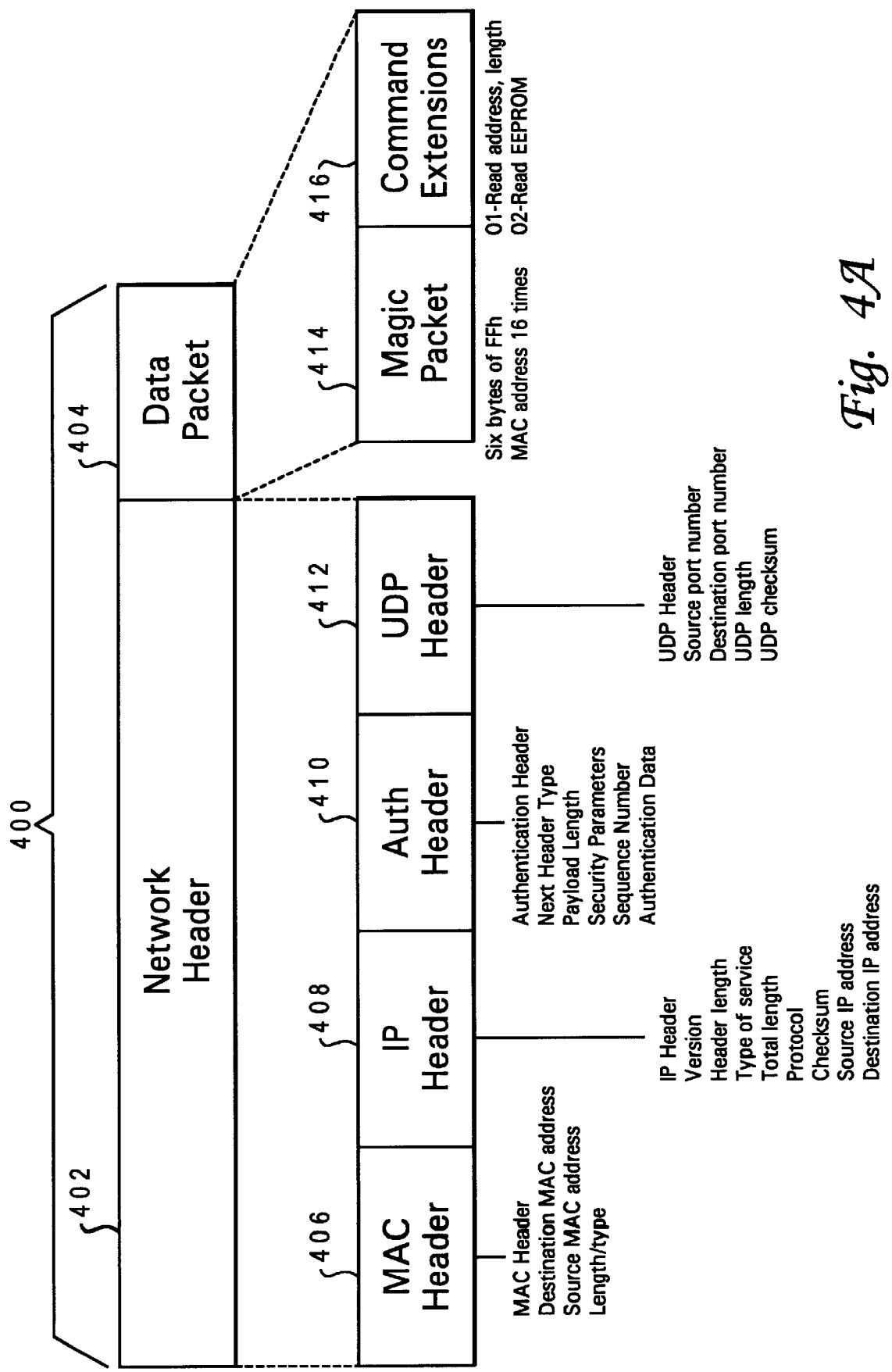
FIG. 4A illustrates a pictorial representation of a network packet, including a network header and a data packet, which may be transmitted by a server computer system over the network in accordance with the method and system of the present invention.

FIG. 4A illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also includes command extensions 416. Server computer system 100 specifies one of a plurality of command extensions in data packet 404 in order to access the client's asset information. For example, the command extension may be a READ ADDRESS command to read a particular address within EEPROM 245, or a READ EEPROM command to read the contents of the entire EEPROM 245.

When a network packet 400 is received by client 104, it is received by physical layer 234 and placed on the MII bus 252. When network packet 400 includes magic packet 414, MAC 232 detects that it includes magic packet 414, and then MAC 232 ignores the network packet 400, including magic packet 414 and command extensions 416. When magic packet 414 is included, ASIC 300 processes network packet 400, including command extensions 416.

ASIC 300 receives network packet 400 utilizing the MII interface 252. Data packet 404 is transferred to RX FIFO 310 and then to RX buffer 318. Micro-controller 302 then inspects data packet 404 and determines which command extensions 416 are included. The appropriate function is executed in accordance with the description which follows.

Figure 4B:
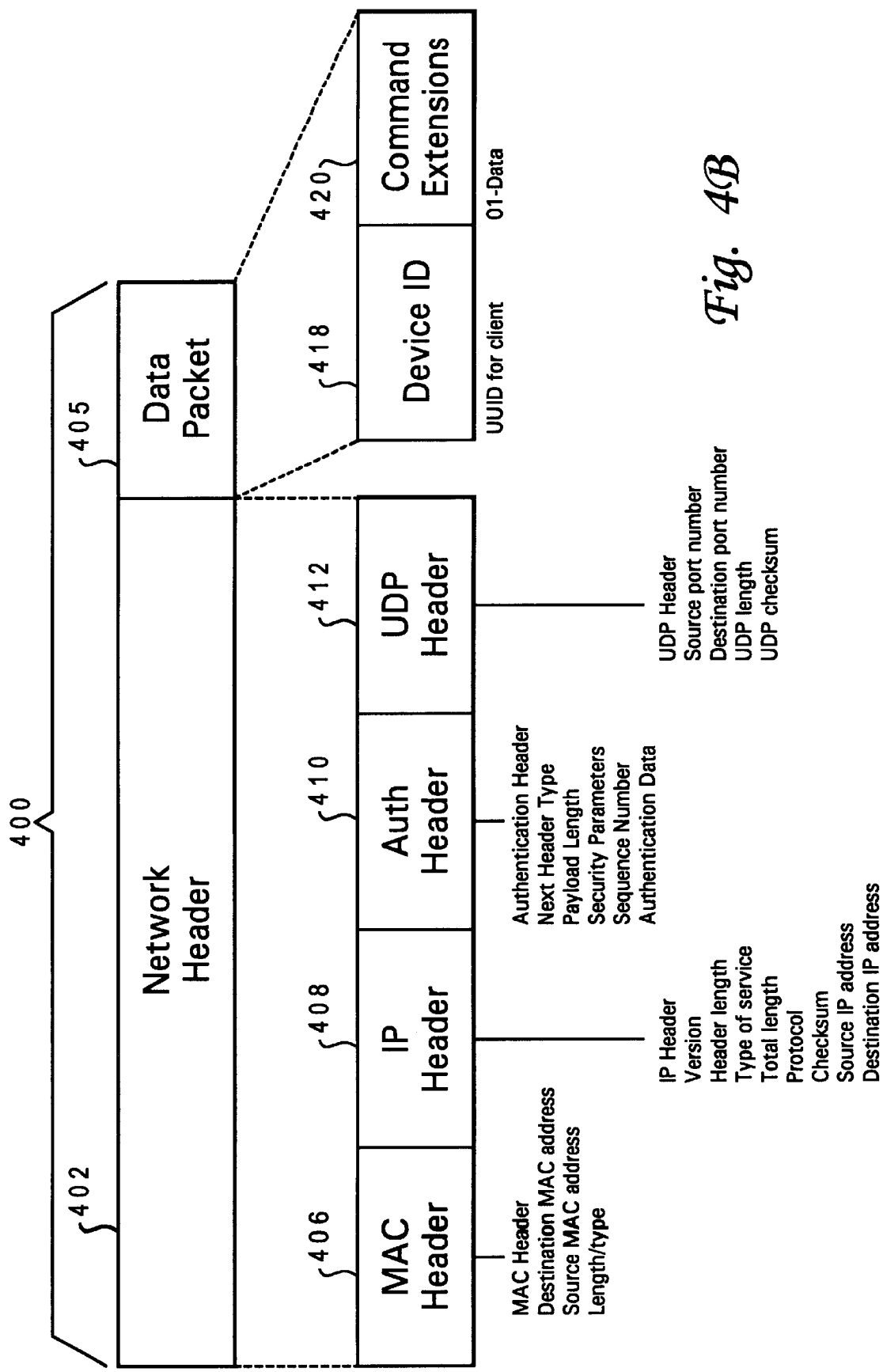
FIG. 4B illustrates a pictorial representation of a network packet, including a network header and a data packet, which may be transmitted by a client computer system over the network in accordance with the method and system of the present invention.

FIG. 4B illustrates a pictorial representation of a network packet 400, including a network header 402 and a data packet 405, which may be transmitted by a client computer system over the network in accordance with the method and system of the present invention. Each network packet 400 includes a network header 402 and a data packet 405.

Data packet 405 includes a device identifier packet 418 and command extensions 420. The device identifier packet includes an identification of the particular client computer system which transmitted this network packet.

Data packet 405 also includes command extensions 420. Client computer system 104 which transmitted the network packet specifies one of a plurality of command extensions in data packet 405 responsive to a command to access asset information stored in asset EEPROM 245 in client 104. The asset information may originally be stored in an asset EEPROM, a flash ROM, a hard drive, or other storage location. For example, the command extension includes the requested data.

Those skilled in the art will recognize that the packet format illustrated in FIGS. 4A and 4B is one method for implementing the invention. However, other suitable packet formats exist which may be utilized to implement the same functionality described in these figures.

Figure 5:
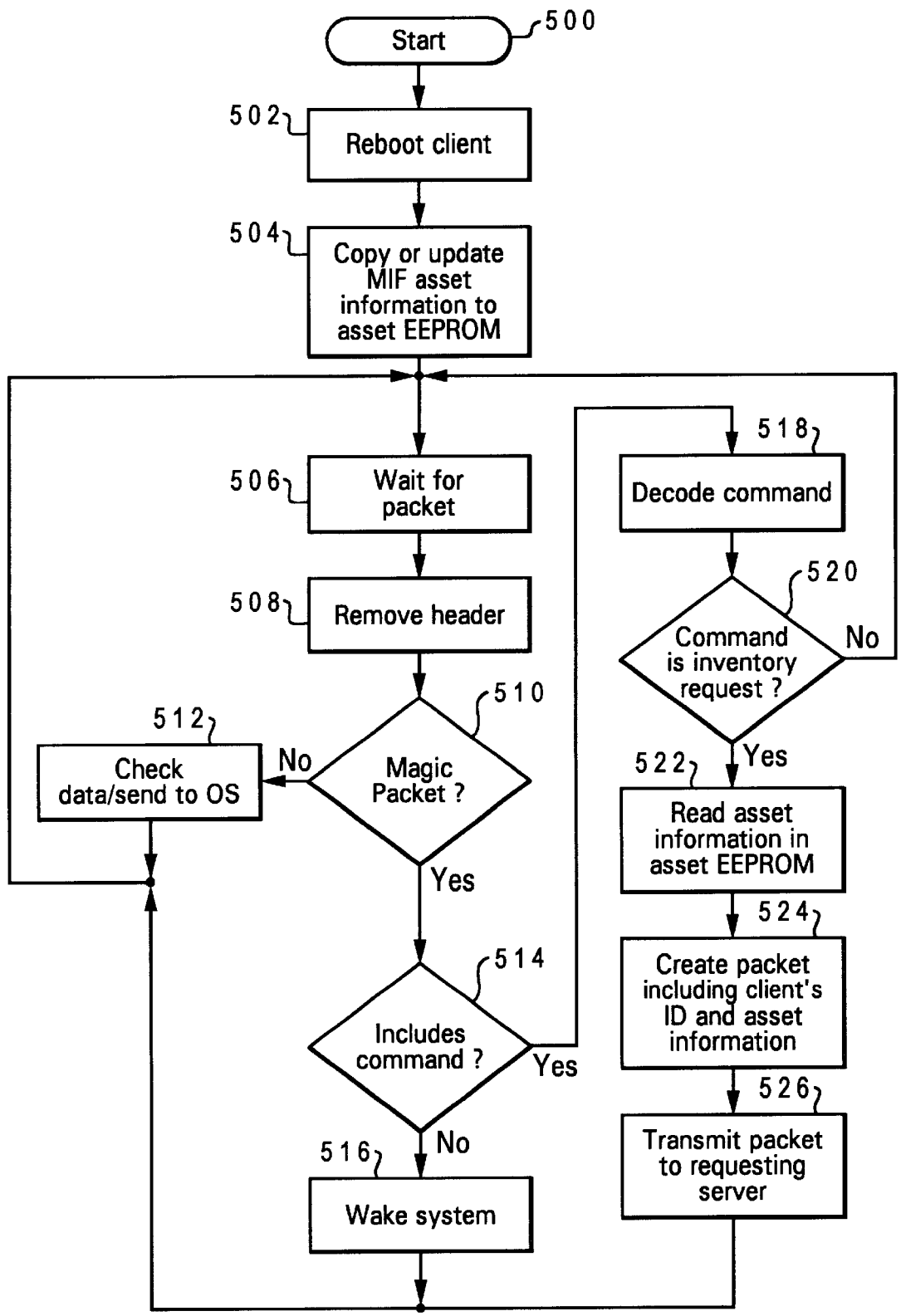
FIG. 5 depicts a high level flow chart which illustrates a client computer system receiving an inventory request and transmitting asset information in accordance with the method and system of the present invention.

FIG. 5 depicts a high level flow chart which illustrates a client computer system receiving an inventory request and transmitting asset information in accordance with the method and system of the present invention. The process starts as depicted by block 500 and thereafter passes to block 502 which illustrates re-booting the client computer system. Next, block 504 depicts the client copying asset information to asset EEPROM 245, or updating the asset information already stored in EEPROM 245. Those skilled in the art will recognize that the asset information may be stored in a hard drive, flash ROM, EEPROM, or other storage. In this case, the asset information must be copied to asset EEPROM 245. However, the asset information may be stored in asset EEPROM 245. In that case, the asset information stored in asset EEPROM 245 must be updated. Thereafter, block 506 illustrates a micro-controller 302 included within the client computer system waiting to receive network packet 400. When the packet has been received, physical layer 234 places data packet 404 included within network packet 400 on the MII bus 252. The MII bus 252 is read by MII interface 312 of ASIC 300. ASIC 300 transfers data packet 404 from MII interface 312 to RX FIFO 310 and to RX buffer 318.

The process then passes to block 508 which depicts micro-controller 302 removing network header 402 from the packet. Next, block 510 illustrates a determination by micro-controller 302 of whether data packet 404 included magic packet 414. If a determination is made that data packet 404 did not include magic packet 414, the process passes to block 512 which depicts the data included within data packet 404 being sent to the operating system (OS). The process then passes back to block 506.

Referring again to block 510, if a determination is made that data packet 404 did include magic packet 414, the process passes to block 514 which illustrates a determination of whether or not data packet 404 also included additional commands 416. If a determination is made that data packet 404 does not include any additional commands 416, the process passes to block 516 which depicts the transmission of a wakeup command which will cause the client to power up. The process then passes back to block 506.

Referring again to block 514, if a determination is made that data packet 404 does include additional commands 416, the process passes to block 518 which depicts the decoding of the additional commands 416. Next, block 520 illustrates a determination of whether or not the command specifies an inventory request. If a determination is made that the command specifies an inventory request, the process passes to block 522 which depicts adapter 230 reading the contents of asset EEPROM 245. The process then passes to block 524 which illustrates adapter 230 creating a packet in accordance with the format depicted in FIG. 4B including the client's identifier and the asset information retrieved from asset EEPROM 245. Block 526, then, depicts adapter 230 transmitting the packet to the server 100. The process then passes back to block 506.

Figure 6:
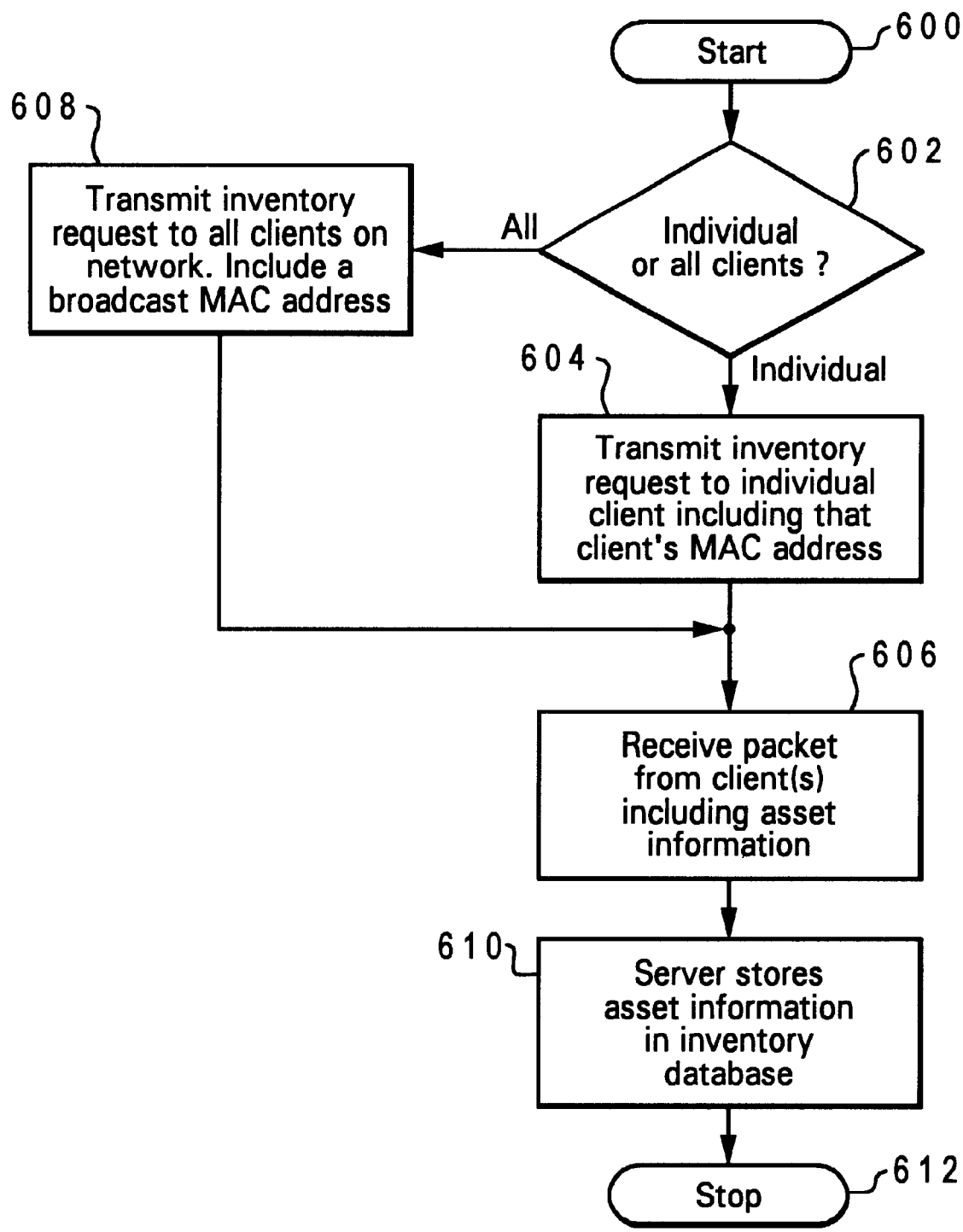
FIG. 6 illustrates a high level flow chart which depicts a server computer system transmitting an inventory request to one or all clients and receiving requested asset information in accordance with the method and system of the present invention.

FIG. 6 illustrates a high level flow chart which depicts a server computer system transmitting an inventory request to one or all clients and receiving requested asset information in accordance with the method and system of the present invention. The process starts as illustrated at block 600 and thereafter passes to block 602 which depicts a determination of whether or not asset information is to be collected for an individual client, or from all clients on the network. If a determination is made that inventory information is to be collected from an individual client computer system, the process passes to block 604 which illustrates server computer system 100 transmitting an inventory request to an individual client computer system. The packet transmitted by the server includes the MAC address which identifies the particular, individual client computer system. The packet also includes an identification of the server which transmitted the packet. The process then passes to block 606.

Referring again to block 602, if a determination is made that inventory information is to be collected from all client computer systems coupled to the network, the process passes to block 608 which depicts server computer system 100 transmitting a packet on the network which includes a broadcast MAC address. When the broadcast MAC address is utilized, all client computer systems coupled to the network will receive the packet. The packet also includes an identification of the server which transmitted the packet. The process then passes to block 606.

Block 606 illustrates server computer system 100 receiving a packet from one or all client computer systems which includes the asset information for the client computer system. Thereafter, block 610 depicts server computer system 100 storing the received asset information in an inventory database for future processing. The process then terminates as illustrated at block 612.

While a preferred embodiment has been particularly shown and described, it will be understood by those skilled in the art that various changes in form and detail may be made therein without departing from the spirit and scope of the present invention.

What is claimed is:

1. A method in a data processing system for permitting a server computer system to remotely access asset information stored within one of a plurality of client computer systems, said one of a plurality of client computer systems being coupled to said server computer system utilizing a network, said method comprising the steps of:

storing said asset information in a constantly-powered storage device within said one of said plurality of client computer systems, said asset information including information identifying a plurality of components of said one of said plurality of client computer systems;

said server computer system transmitting a message to said one of said plurality of client computer systems while said one of said plurality of client computer systems is powered-off to access said asset information from said storage device; and a constantly-powered network adapter included within said one of said plurality of client computer systems in response to a receipt of said message accessing said storage device to obtain said asset information while said one of said plurality of client computer systems is powered-off.

2. The method according to claim 1, further comprising the step of said network adapter transmitting said obtained asset information to said server computer system while said one of said client computer systems is powered-off.

3. The method according to claim 2, further comprising the step of said server computer system transmitting said message to all of said plurality of client computer systems while each of said client computer systems is powered-off, wherein all of said plurality of client computer systems receive said message approximately simultaneously.

4. The method according to claim 3, further comprising the step of in response to all of said plurality of client computer systems receiving said message, a network adapter included within each of said plurality of client computer systems accessing a storage device within each of said plurality of client computer systems to obtain asset information stored within said storage device while each of said plurality of client computer systems is powered-off.

5. The method according to claim 4, further comprising the step of said network adapter included within each of said plurality of client computer systems transmitting said obtained asset information to said server computer system while each of said client computer systems is powered-off.

6. The method according to claim 1, further comprising the step of supplying an auxiliary power to said constantly-powered storage device.

7. The method according to claim 1, further comprising the step of supplying an auxiliary power to said constantly-network adapter.

8. The method according to claim 1, further comprising the step of storing said asset information in a constantly-powered, electronically erasable memory storage device.

9. A data processing system for permitting a server computer system to remotely access asset information stored within one of a plurality of client computer systems, said one of a plurality of client computer systems being coupled to said server computer system utilizing a network, comprising:

a constantly-powered storage device within said one of said plurality of client computer systems for storing said asset information, said asset information including information identifying a plurality of components of said one of said plurality of client computer systems;

said server computer system executing code for transmitting a message to said one of said plurality of client computer systems while said one of said plurality of client computer systems is powered-off to access said asset information from said storage device; and a network adapter included within said one of said plurality of client computer systems in response to a receipt of said message, executing code for accessing said storage device to obtain said asset information while said one of said plurality of client computer systems is powered-off.

10. The system according to claim 9, further comprising said network adapter executing code for transmitting said obtained asset information to said server computer system while said one of said client computer systems is powered-off.

11. The system according to claim 10, further comprising said server computer system executing code for transmitting said message to all of said plurality of client computer systems while each of said client computer systems is powered-off, wherein all of said plurality of client computer systems receive said message approximately simultaneously.

12. The system according to claim 11, further comprising in response to all of said plurality of client computer systems receiving said message, a network adapter included within each of said plurality of client computer systems capable of accessing a storage device within each of said plurality of client computer systems to obtain asset information stored within said storage device while each of said plurality of client computer systems is powered-off.

13. The system according to claim 12, further comprising said network adapter included within each of said plurality of client computer systems executing code for transmitting said obtained asset information to said server computer system while each of said client computer systems is powered-off.

14. The system according to claim 9, further comprising a power supply for supplying an auxiliary power to said constantly-powered storage device.

15. The system according to claim 9, further comprising said power supply for supplying an auxiliary power to said constantly-network adapter.

16. The system according to claim 9, further comprising a constantly-powered, electronically erasable memory storage device for storing said asset information.

17. A data processing system for permitting a server computer system to remotely access asset information stored within one of a plurality of client computer systems, said one of a plurality of client computer systems being coupled to said server computer system utilizing a network, comprising:

a constantly-powered, electronically erasable memory storage device within said one of said plurality of client computer systems for storing said asset information, said asset information including information identifying a plurality of components of said one of said plurality of client computer systems;

said server computer system executing code for transmitting a message to said one of said plurality of client computer systems while said one of said plurality of client computer systems is powered-off;

a constantly-powered network adapter included within said one of said plurality of client computer systems capable of accessing said storage device to obtain said asset information while said one of said plurality of client computer systems is powered-off;

said network adapter executing code for transmitting said obtained asset information to said server computer system while said one of said client computer systems is powered-off; and a power supply for supplying an auxiliary power to said constantly-powered storage device and said constantly-powered network adapter.

* * * * *